United States Patent [19]
Eckert et al.

[11] Patent Number: 5,528,639
[45] Date of Patent: Jun. 18, 1996

[54] ENHANCED TRANSIENT OVERPOWER PROTECTION SYSTEM

[75] Inventors: Eugene C. Eckert, Los Gatos; Jeffrey W. Simmons, San Jose, both of Calif.

[73] Assignee: General Electric Company, San Jose, Calif.

[21] Appl. No.: 283,694

[22] Filed: Aug. 1, 1994

[51] Int. Cl.⁶ .................................................. G21C 7/36
[52] U.S. Cl. .......................... 376/216; 376/215; 376/241; 376/244
[58] Field of Search ............................. 376/216, 215, 376/241, 244; 976/DIG. 301, DIG. 302, DIG. 303, DIG. 304

[56] References Cited

U.S. PATENT DOCUMENTS

| | | |
|---|---|---|
| 3,791,922 | 2/1974 | Musick .................................. 376/217 |
| 3,979,255 | 9/1976 | Bulgier et al. ........................ 376/215 |
| 4,326,917 | 9/1982 | Kelly, Jr. et al. .................... 376/216 |
| 4,678,622 | 7/1987 | Rowe et al. .......................... 376/259 |
| 4,707,324 | 11/1987 | Storrick ................................ 376/215 |
| 5,009,833 | 4/1991 | Takeuchi et al. .................... 376/217 |
| 5,309,485 | 5/1994 | Chao ...................................... 376/215 |
| 5,379,328 | 1/1995 | Perez et al. .......................... 376/217 |

Primary Examiner—Donald P. Walsh
Assistant Examiner—Meena Chelliah
Attorney, Agent, or Firm—James E. McGinness

[57] ABSTRACT

An enhanced protection system for protecting against transient overpower in a boiling water nuclear reactor which automatically adjusts the reactor over-power protection trip setpoints to be a controlled margin above the operating power level, so that enhanced fuel and reactor protection is provided at all power levels.

18 Claims, 12 Drawing Sheets

ENHANCED TRANSIENT OVERPOWER PROTECTION SYSTEM

FIELD OF THE INVENTION

This invention generally relates to an enhanced fuel and reactor protection system for boiling water reactor (BWR) nuclear power plants.

BACKGROUND OF THE INVENTION

A conventional BWR includes a pressure vessel containing a nuclear fuel core immersed in circulating coolant, i.e., water, which removes heat from the nuclear fuel. The water is boiled to generate steam for driving a steam turbine-generator for generating electrical power. Respective piping circuits carry the heated water or steam to the steam generators or turbines and carry recirculated water or feedwater back to the vessel.

The BWR includes several conventional closed-loop control systems which control various individual operations of the BWR in response to demands. For example, a conventional recirculation flow control system (RFCS) is used to control core flowrate, which in turn determines the output power of the reactor core. A control rod drive system controls the control rod position and thereby controls the rod density within the core for determining the reactivity therein. A turbine control controls steam flow from the BWR to the turbine based on load demands and pressure regulation.

The operation of all of these systems, as well as other conventional systems, is controlled utilizing various monitoring parameters of the BWR. Exemplary monitoring parameters include core flow and flowrate effected by the RFCS, reactor vessel dome pressure (which is the pressure of the steam discharged from the pressure vessel to the turbine), neutron flux or core power, feedwater temperature and flowrate, steam flowrate provided to the turbine and various status indications of the BWR systems. Many monitoring parameters are measured directly by conventional sensors, while others, such as core thermal power, are conventionally calculated using measured parameters. These status monitoring parameters are provided as output signals from the respective systems.

Nuclear reactors are conservatively specified to minimize any risks from the hazardous materials involved in their use. The materials used in BWRs must withstand various loading, environmental and radiation conditions. For example, operating pressures and temperatures for the reactor pressure vessel are about 7 MPa and 288° C. for a BWR. Reactor vessel walls are thus several inches thick and very strong materials are used for reactor components. Nonetheless, contingencies are required for failure as components are subjected to operational stress for decades. These contingencies involve not only many layers of preventive systems, but also procedures for rectifying problems that arise.

Conventional reactor control systems have automatic and manual controls to maintain safe operating conditions as the demand is varied. The several control systems control operation of the reactor in response to given demand signals. Computer programs are used to analyze thermal and hydraulic characteristics of the reactor core for the control thereof. The analysis is based on nuclear data selected from analytical and empirical transient and accident events, and from reactor physics and thermal-hydraulic principles. In the event of an abnormal transient event, the reactor operator is usually able to diagnose the situation and take corrective action based on applicable training, experience and judgment. Whether the manual remedial action is sufficient depends upon the event and upon the operator's knowledge and training. If the event is significant (i.e., challenges any of the reactor safety limits), reactor trip (also referred to as reactor shutdown, scram, or insertion of all control rods) may be required. Some transient events may occur quickly, i.e., faster than the capability of a human operator to react. In such an event, a reactor trip will be automatically effected. Safety analyses generally show that no operator action is necessary within 10 minutes of a postulated event.

A conventional nuclear reactor protection system comprises a multi-channel electrical alarm and actuating system which monitors operation of the reactor, and upon sensing an abnormal event initiates action to prevent an unsafe or potentially unsafe condition. The conventional protection system provides three functions: (1) reactor trip which shuts down the reactor when certain monitored parameter limits are exceeded; (2) nuclear system isolation which isolates the reactor vessel and all connections penetrating the containment barrier; and (3) engineered safety feature actuation which actuates conventional emergency systems such as cooling systems and residual heat removal systems.

Core power protection schemes are typically employed in BWRs when the reactor is operating in the normal power range (i.e. above heatup and startup of the unit). Reactor trip is initiated for certain transient events that could cause an increase in power above the maximum safe operating level. Generally, an overpower equal to about 120 percent of the rated power can be tolerated without causing damage to the fuel rods. If thermal power should exceed this limiting value (the maximum safe operating level) or if other abnormal conditions should arise to endanger the system, the reactor protection system will cause reactor trip.

An essential requirement of a nuclear reactor protection system is that it must not fail when needed. Therefore, unless the operator promptly and properly identifies the cause of an abnormal transient event in the operation of the reactor, and promptly effects remedial or mitigating action, conventional nuclear reactor protection systems will automatically effect reactor trip. However, it is also essential that reactor trip be avoided when it is not desired or necessary, i.e., when there is an error in the instrumentation or when the malfunction is small enough that reactor trip is unnecessary.

Three primary power-related methods are conventionally used to ensure that acceptable fuel and reactor protection are maintained. Each method uses monitored neutron flux to sense when an increase in power occurs, but each employs a different method to initiate reactor trip.

The first known method of protection causes reactor trip or shutdown if the monitored neutron flux exceeds a preselected and fixed setpoint. This maximum operating level is normally about 120% of rated power.

The second method of protection causes reactor trip if the monitored neutron flux exceeds a preselected, but flow-referenced setpoint. In this method, the setpoint is equal to that of the first method when the reactor core flow is high. However, when reactor core flow is reduced, the setpoint is also reduced.

The third method of protection involves electronically filtering the neutron flux signal to produce a signal that has been called simulated thermal power (STP). Usual practice is to employ a single time constant filter that approximates the thermal response of the reactor fuel rods. Reactor trip is initiated when the STP signal exceeds the flow-referenced setpoint of the second method. The third method is usually used in combination with the first method.

In all three known methods, the reactor trip set-point is above the normal operating range to avoid undesired trips during operation in the upper portion of the range. If more protection is required due to partial core power and flow conditions, the setpoints are manually adjusted. These manual adjustments are a cumbersome nuisance for reactor operators. However, if the setpoints are not adjusted, complex and restrictive core operating limits are required to ensure acceptable protection at all operating power and flow conditions.

In addition, new, slow transient events have been postulated in the partial power and flow range that challenge the effectiveness of the three conventional protection methods. These slow transient events have been postulated to avoid the current, high-power protection setpoints. Since the postulated events are slow, reactor operators are able to manually respond with appropriate mitigation actions.

SUMMARY OF THE INVENTION

The present invention is a protection system which automatically adjusts reactor overpower protection trip setpoints to be a controlled margin above the operating power level of the BWR to enhance mitigation of potential transient events. Enhanced protection will be realized upon occurrence of unplanned increases in the monitored operating parameters. The invention provides enhanced protection for normal transient events and automatic protection where needed for the newly postulated slow events. More specifically, the invention provides enhanced reactor protection when the reactor is operating at less than the maximum operating level.

When the reactor is operating at 100% power or along the maximum operating line, the setpoints provided by the invention will be automatically adjusted to be essentially the same as in conventional protection systems. However, if the reactor is operating at a partial power condition, the invention provides set-points that are closer to the partial operating point to provide for system shutdown upon an unplanned change in reactor conditions. In reactor operations, the term "transient" generally describes any significant deviation from the normal value of any one or more of the important operating parameters (e.g. an unexpected increase in power that may not rise above the maximum operating line, but could still be harmful to the reactor). If the transient is a minor one, within the permissible operating limits of the system, the invention adjusts the controls (i.e., setpoints) automatically to compensate for the deviation. However, if the transient is large and unplanned, the setpoints will be tripped. When the setpoints are tripped, the reactor protection system is activated. The reactor protection system then shuts the reactor down, prevents any damage to the core and maintains the reactor in a safe condition. If the transient is one that cannot be corrected immediately by the control system, the reactor is shut down automatically by the protection system. If the protection system indicates that an unsafe condition may be developing, an alarm sounds to alert the reactor operator, who can then take corrective action or cause a manual trip to shut down the reactor.

In accordance with the invention, a high-power protection system is provided for BWR nuclear power plants in which alarm and trip setpoints are adjusted to follow or track the operating power condition. The safety system setpoints (at which transient mitigation action is initiated) are adjusted so that they are much closer to a partial power operating point than is the case in conventional protection designs. The closest setpoint to the partial power operating point is an alarm setpoint which, when tripped, first warns the operator of an unexpected minor transient. This alarm (and potentially a second alarm, set slightly higher) can also be used to initiate automatic corrective actions that could avoid complete reactor trip. Above the alarm setpoint(s) is a scram setpoint which, when tripped, shuts the reactor down in response to a severe transient.

DETAILED DESCRIPTION OF THE PREFERRED EMBODIMENTS

Figure 1:
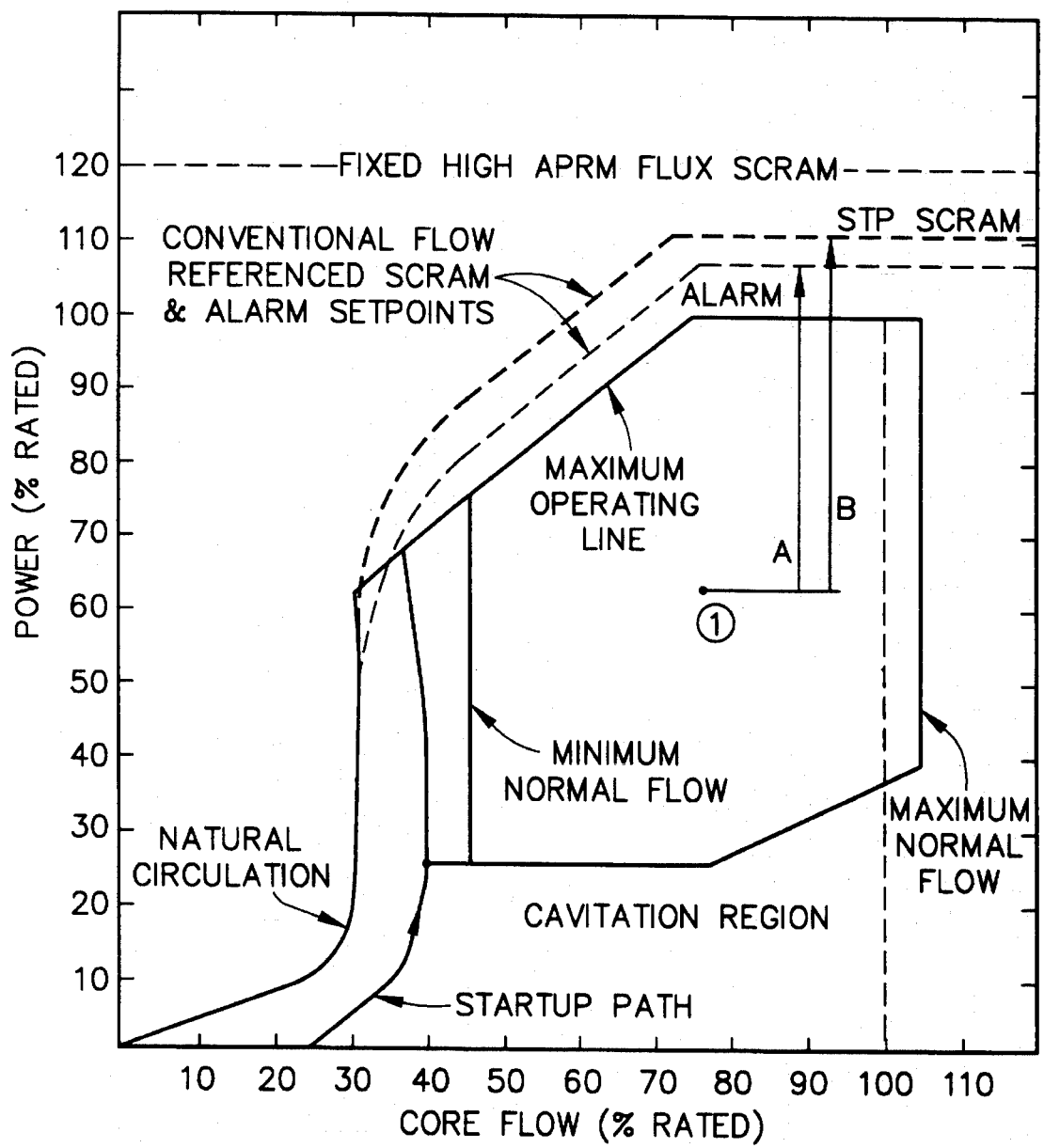
FIG. 1 is a BWR power/flow operating map showing conventional high-power protection methods.

FIG. 1 is a typical BWR power/flow operating map showing a conventional protection system having the alarm setpoint a distance A above the operating point 1 and the scram setpoint a distance B above the operating point 1, both setpoints being above the maximum operating line. After startup, the permissible operating range for a BWR is above the cavitation region, below the maximum operating line and bounded by the minimum normal flow line and the maximum normal flow line. In conventional protection systems, when the BWR is operating within the operating zone, an unplanned transient that does not increase the power level above the maximum operating line will not be detected by the setpoints and reactor trip will not occur. The invention overcomes this problem by providing safety system setpoints (at which transient mitigation action is initiated) which are adjusted so that they are much closer to the operating power level (for example, point 1) than conventional protection designs. This principle can be applied as needed throughout the entire normal power/flow operating range shown in FIG. 1.

Figure 2:
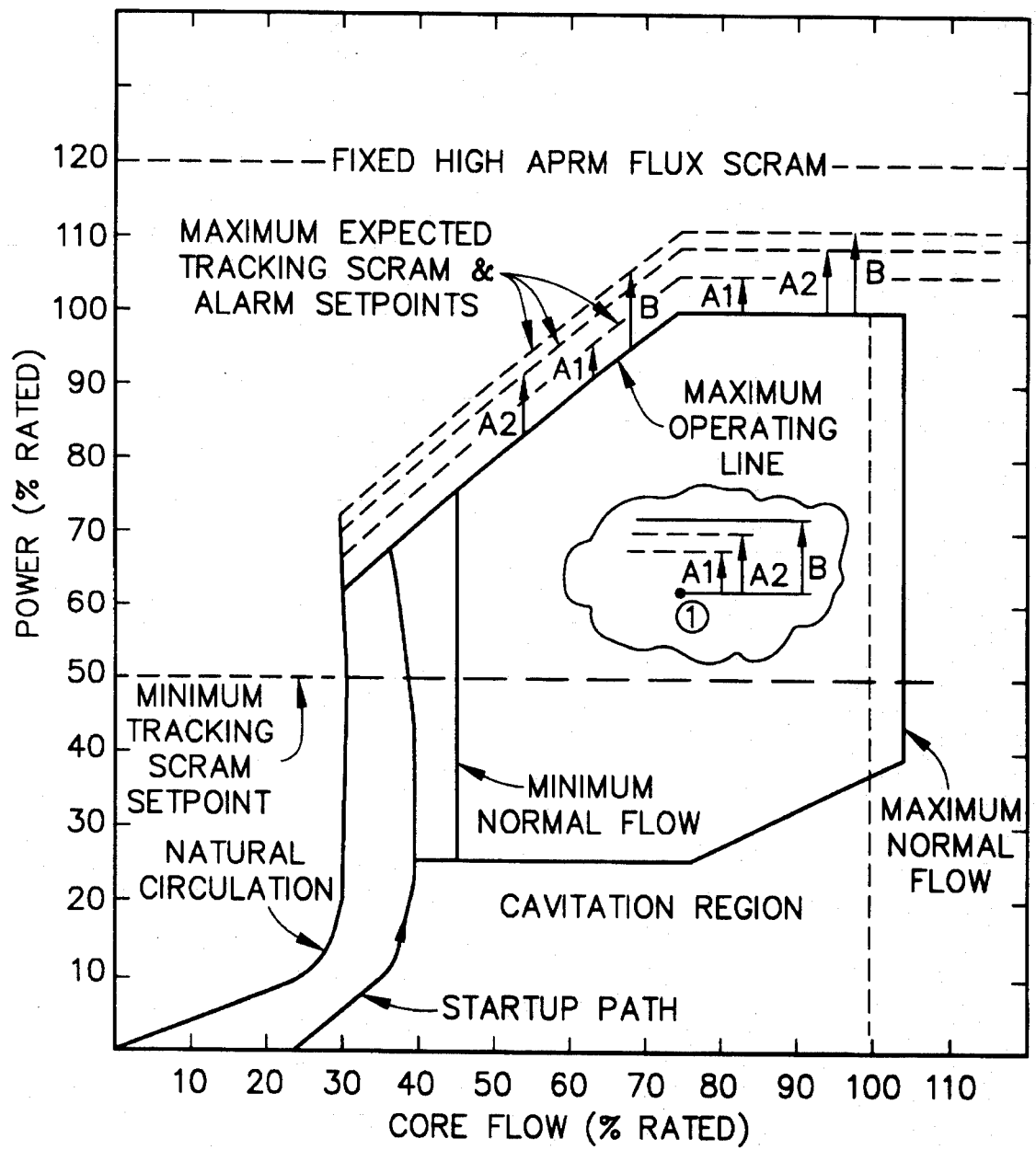
FIG. 2 is a BWR power/flow operating map showing the tracking power protection method in accordance with the present invention.

FIG. 2 is an example of a BWR power/flow operating map showing the enhanced protection provided by the invention. If the reactor is operating at 100% power or along the maximum operating line, the setpoints provided by the invention will be automatically adjusted to essentially the same position as in conventional protection systems (a distance of either A or B above operating point 1 in FIG. 1). However, if the reactor is operating at a partial power condition (such as point 1 in FIG. 2), the invention provides alarm and scram setpoints that are closer to that point. In FIG. 2, A1 and A2 represent the adjusted margins between the operating point and two alarm setpoints and B represents the adjusted margin between the operating point and a scram setpoint.

Figure 4:
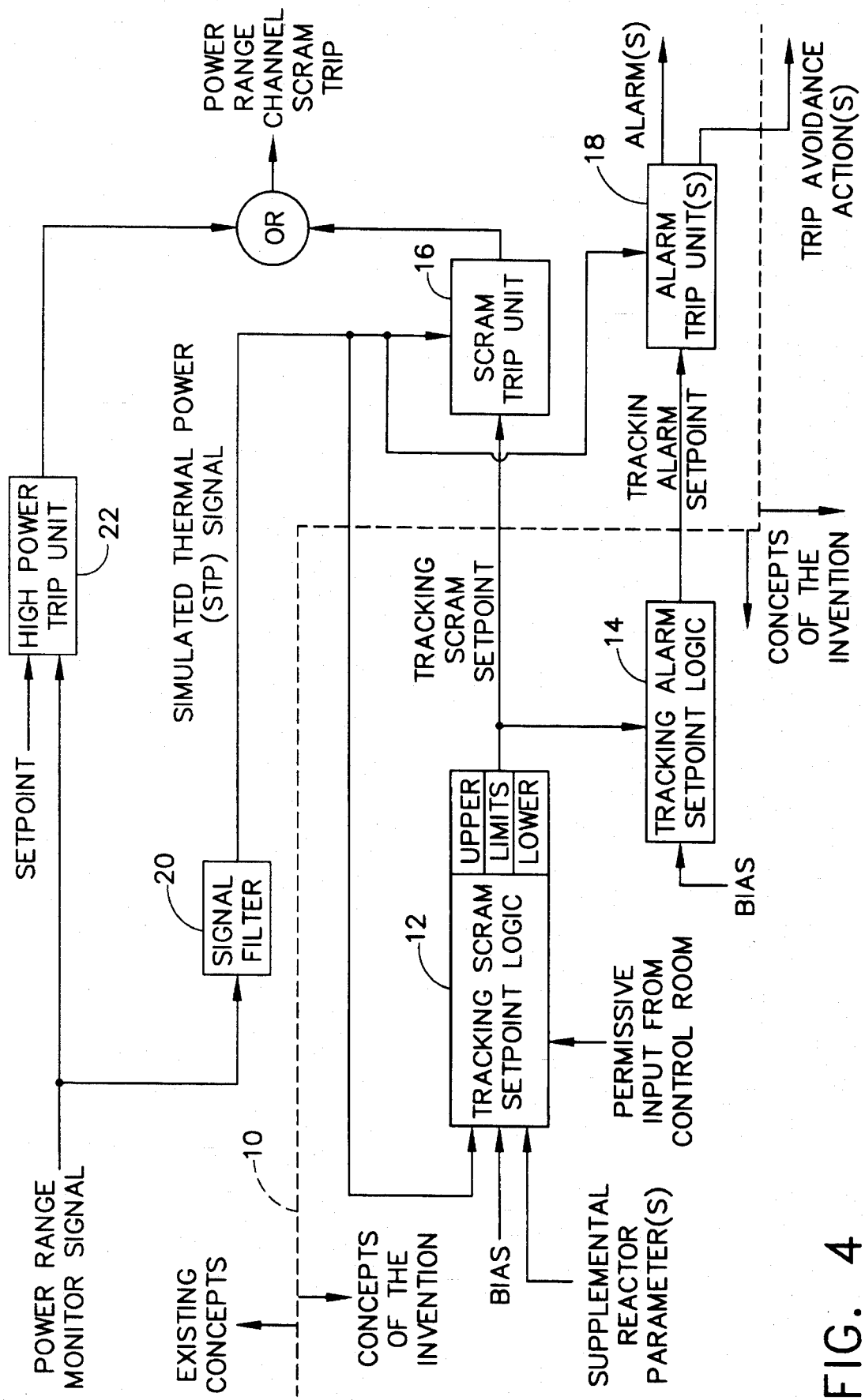
FIG. 4 is a block diagram showing typical signals and logic of the tracking power protection method in accordance with the prior art as modified by the present invention.

The tracking logic in accordance with the invention controls the adjustment of the alarm and scram setpoints so that they are set the desired amount (A1, A2 and B) above any operating condition within the BWR's range of operation. Typical signals and functions included in the invention are shown in FIG. 4. The new portions of logic added by the invention are demarcated from conventional design elements by a dashed line 10. This simplified diagram is intended to illustrate the essential principles of the invention. It does not show the redundancy necessary for reactor protection functions, nor is it to be construed as the only manner in which the functional logic of the invention can be implemented.

Referring to FIG. 4, the invention's tracking scram setpoint logic 12 and tracking alarm setpoint logic 14 (only one alarm function is shown for simplicity) maintain the desired trip margin during planned power increases by automatically increasing the scram and alarm setpoints. These setpoints are respectively used by the scram trip unit 16 and alarm trip unit 18 to monitor the STP signal output from filter 20. Reactor scram can be initiated by the output of a scram signal from either scram trip unit 16 or high power trip unit 22.

Planned power changes are identified by a permissive input signal which may be generated manually by the reactor operator or in association with normal methods of increasing power (e.g., control rod withdrawals or recirculation flow setpoint increases). However, when an unplanned power increase occurs, the tracking logic will not increase the setpoints except as controlled, thereby providing enhanced protection. The setpoint adjustment will also automatically track any reactor maneuver which significantly reduces the power level. In this way the protection setpoints are reestablished near the new, final operating point. The upper and lower values of the setpoints may also be limited to bound the function of the invention to a desired operating range.

The tracking logic of the invention may use one or more alarms (A1, A2) in conjunction with the STP scram signal (B) (shown in FIG. 2). The use of alarm signals to perform active functions to avoid full reactor trip (or scram) is another important attribute of the invention. In addition to alerting the operator, various actions may be initiated at the alarm setpoint(s) (A1, A2) to stop the power increase without imposing the operational penalties associated with total shutdown of the reactor caused by scram. Such actions include, but are not limited to, blocking of control rod withdrawal, reduction of reactor recirculation flow and insertion of selected control rods.

An additional feature of the invention is the option to include supplementary adjustment of the high-power trip setpoints based on signals from other reactor parameters. For example, the setpoints may be adjusted in dependence on reactor pressure, reactor recirculation flow or feedwater temperature. The reactor protection system in accordance with the invention also includes the ability to use either the filtered STP signal and/or the direct neutron flux signal (i.e., the "power range monitor signal" in FIG. 4) as the input to the tracking scram setpoint logic 12. The setpoints used with a direct neutron flux signal must be set higher than those used with the STP filter 20 method to avoid inadvertent actuation.

Figure 3:
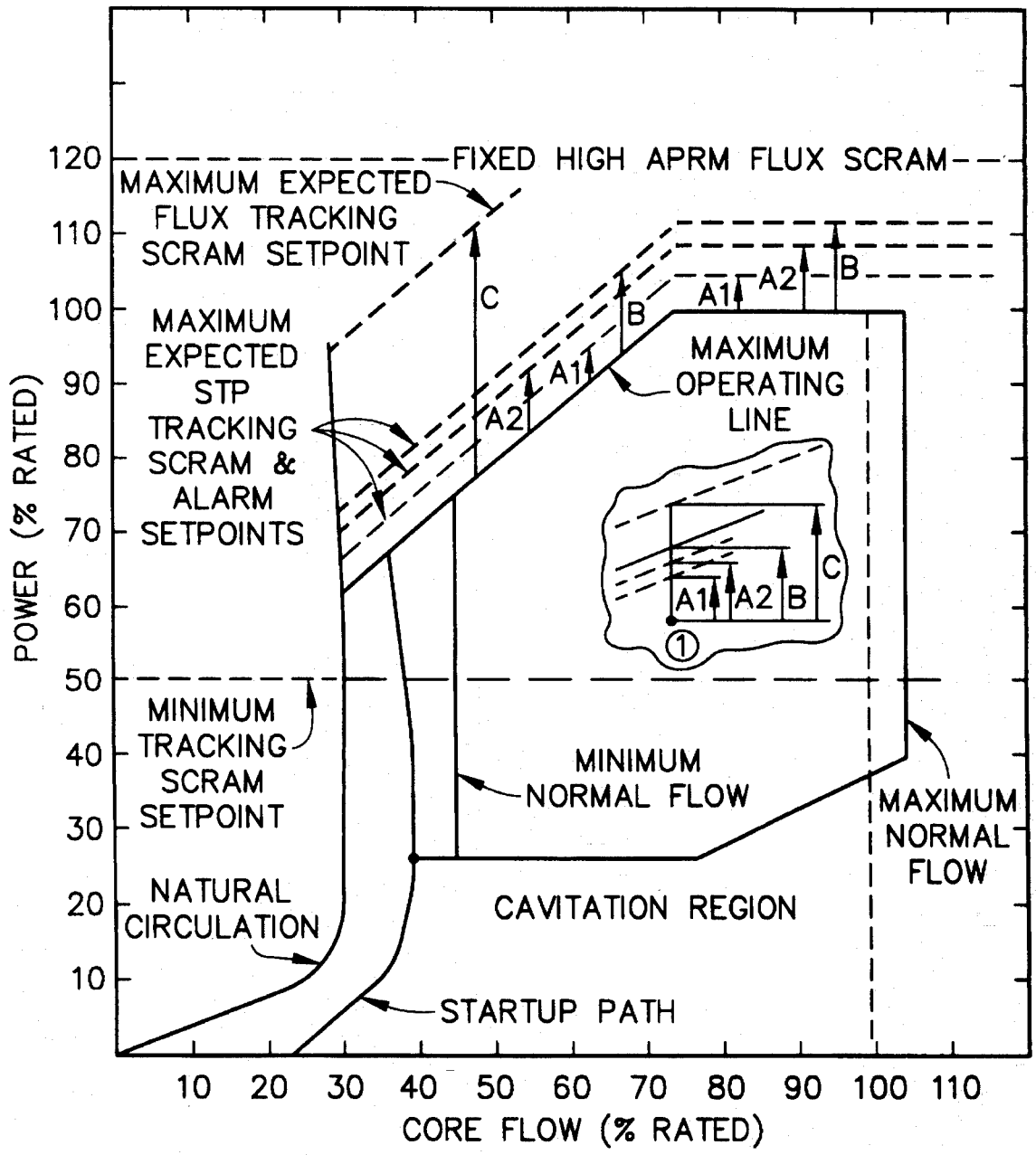
FIG. 3 is a BWR power/flow operating map showing an example of the flow-referenced tracking power protection method in accordance with the present invention with tracking setpoints supplemented by a recirculation flow signal.

FIG. 3 shows an example of an application of the invention with tracking setpoints supplemented by a recirculation flow signal. If the reactor is operating at full power or along the maximum operating line, it is similar in many respects to the example shown in FIG. 2, with the maximum expected setpoints adjusted to be essentially equal to the setpoints of conventional protection systems. The setpoints are also adjusted to be the desired margin above any partial power operating point (for example, operating point 1 in FIG. 3). The unique aspect of this application is that the scram and alarm setpoints are also varied automatically with changes in reactor recirculation flow (the setpoints have a flow-referenced slope above point 1 in FIG. 3). Also shown in FIG. 3 is an example of the alternative to use a direct neutron flux signal in conjunction with the tracking setpoint logic (set above the STP setpoints at C).

The amount of the variation with flow (the slope of the setpoint lines above point 1 in FIG. 3) can be chosen to optimize performance of the invention during reactor flow and power maneuvers. The variation of the setpoints with supplemental reactor parameters (e.g., recirculation flow in this example) may also be limited in magnitude and/or direction of change to optimize the effectiveness of the application of the invention.

If the flow-referenced option is used, as shown in FIG. 3, the setpoints will also be automatically increased if the power increase is caused by an unplanned reactor recirculation flow increase. However, the setpoint increase will be a controlled amount according to the slope of the flow-dependent setpoint variation.

The invention therefore provides enhanced reactor protection by adjusting the trip setpoints so that they remain close to the operating point anywhere in the power/flow operating range of the reactor. In conjunction with this closer safety trip (scram) protection, the invention provides alarms that are simultaneously adjusted so that automatic actions can also be initiated to avoid full shutdown of the unit during transient events. The setpoints automatically track power decreases, but increases of the setpoints are restricted so that they provide enhanced protection for all unplanned transients that increase reactor power. The tracking protection of the invention responds favorably to simulated reactor transients, including the postulated, slow events. A few transient examples are presented hereinbelow to demonstrate the performance of the present invention.

EXAMPLE 1

Temperature Transient, Basic Invention

Figure 5A:
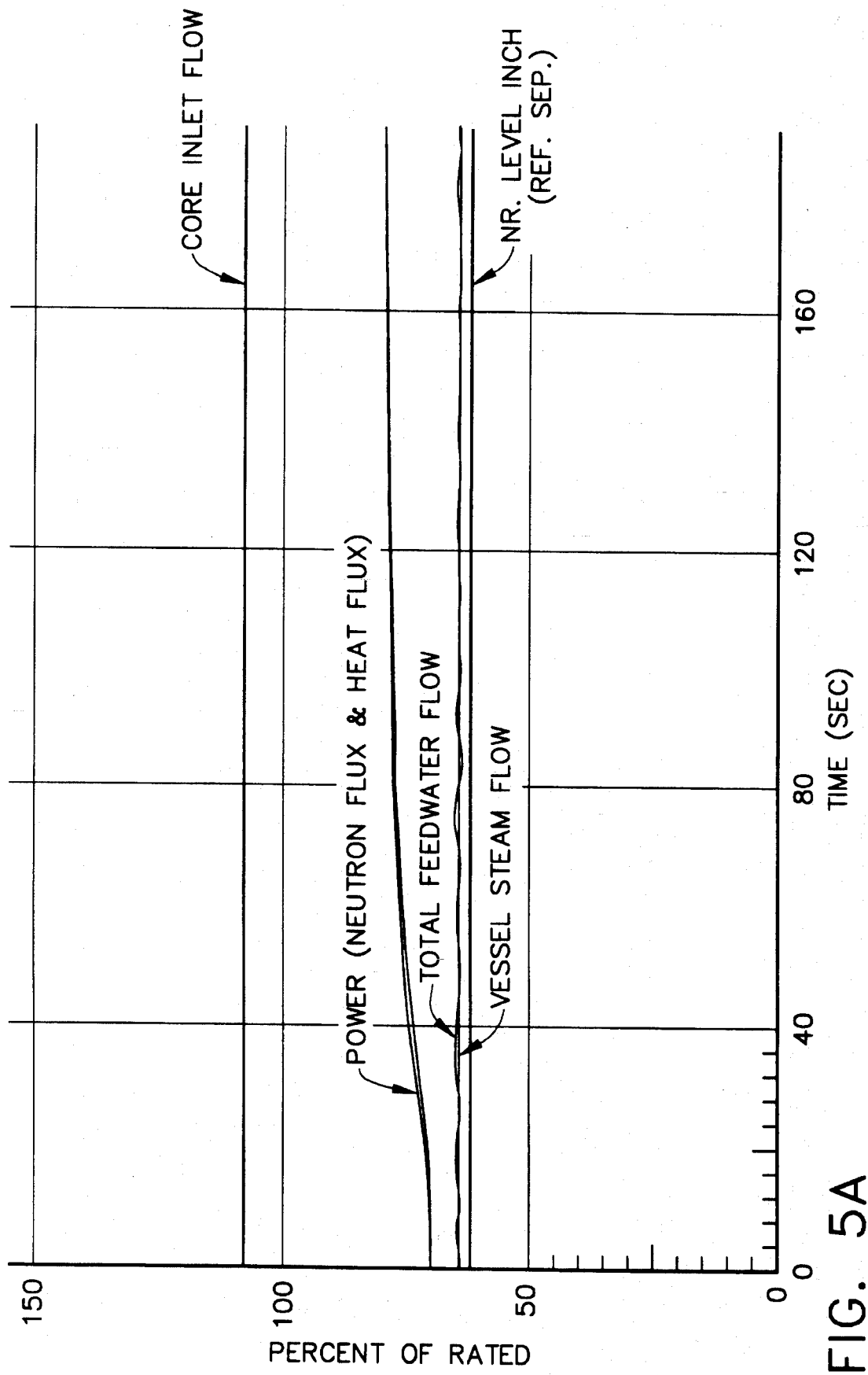
FIG. 5A is a graph showing the response over time of key reactor parameters to a reactor temperature (subcooling) transient.
Figure 5B:
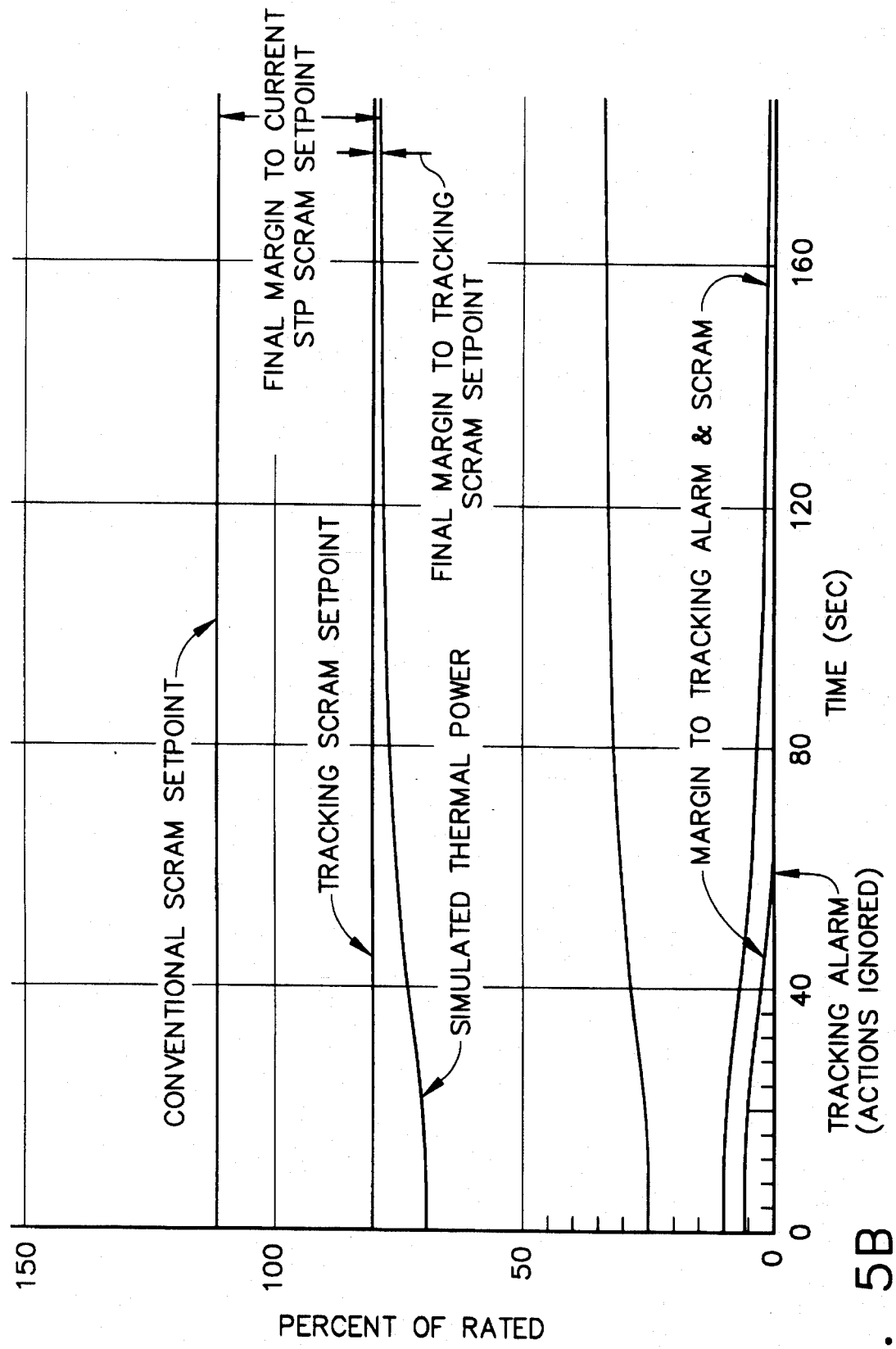
FIG. 5B is a graph showing the setpoints determined in response to the reactor temperature (subcooling) transient shown in FIG. 5A for 70% power, maximum core flow, in accordance with the basic invention.

One type of event that can occur in a BWR is a change in the temperature of the coolant flow being supplied to the reactor core. One way that this can happen is if a portion of the feedwater heaters fail to operate properly. FIGS. 5A and 5B show the calculated response of the reactor and the enhanced protection logic over time to this type of an event. The initial power is 70% and the reactor is assumed to be operating with maximum normal core flow.

This operating condition is a significant amount below the conventional scram setpoint (shown in FIG. 5B). FIGS. 5A and 5B show that as the cooler water reaches the reactor, the power gradually increases. In this case, the STP signal increases almost up to the tracking scram setpoint provided by the invention.

In FIG. 5B, the margins to the tracking alarm and scram setpoints are shown as the event progresses. In this example, only one alarm was simulated, and no scram avoidance actions were initiated when the alarm was reached (near 60 seconds, well ahead of when the scram setpoint is approached).

The transient simulated in FIGS. 5A and 5B is equal to the maximum change in feedwater temperature currently allowed (100° F.). Any larger change in temperature is unlikely. But should it occur, it would reach the scram setpoint provided by the invention. Therefore, acceptable reactor fuel protection is assured by the reactor protection system of the present invention. In contrast, conventional systems would not provide such protection if the same event were to occur because the conventional STP setpoint is well above the power transient. Therefore, manual operator actions would be required under conventional systems to provide protection.

The performance shown in this example applies primarily to the basic invention. However, it also applies to the flow-referenced logic option if the reactor core flow remains constant during the event (manual flow control). Response in automatic flow control with the flow-referenced option is provided in the next example.

EXAMPLE 2

Temperature Transient, Flow-Referenced Tracking Option

Figure 6A:
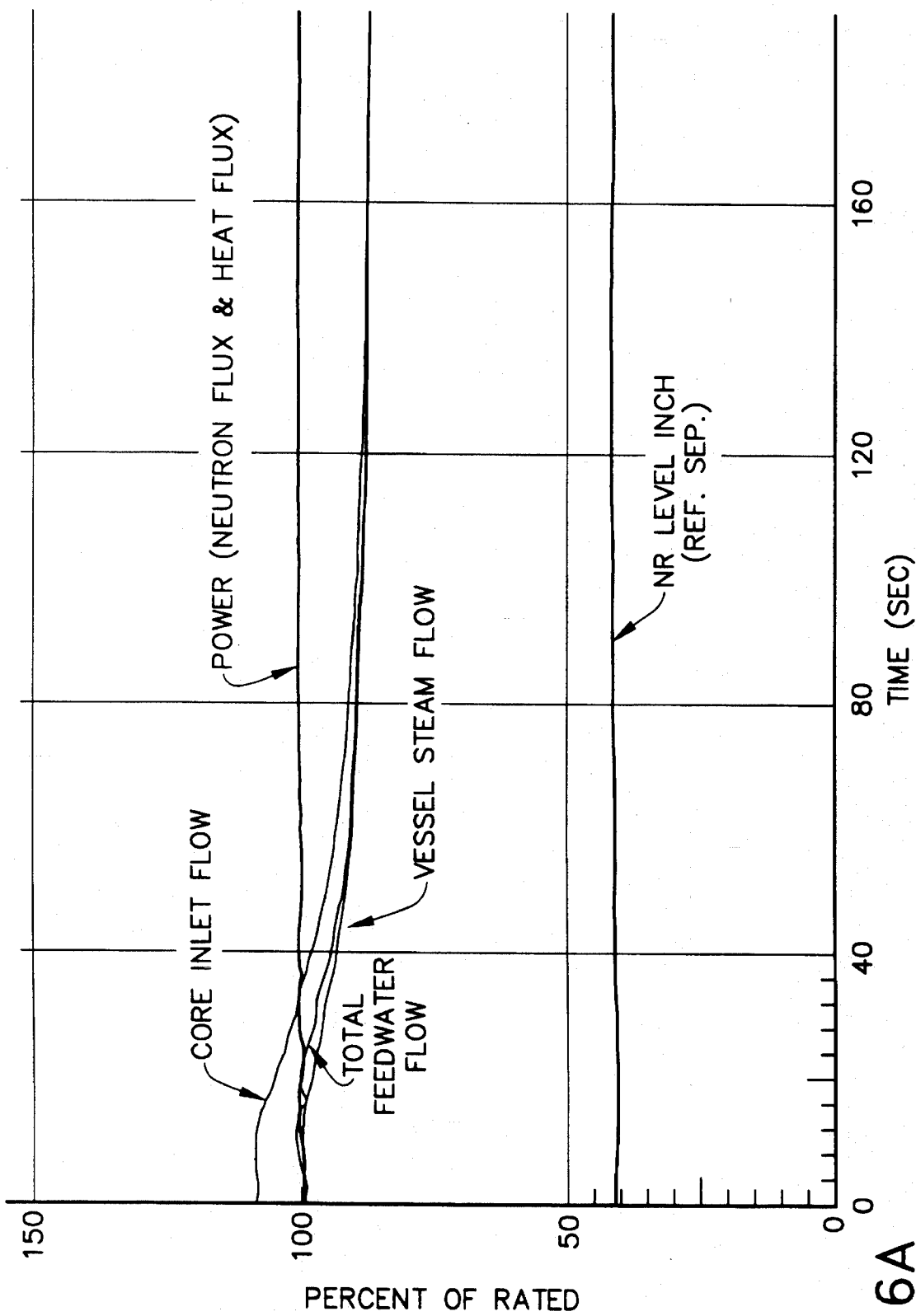
FIG. 6A is a graph showing the response over time of key reactor parameters to a reactor temperature (subcooling) transient with the reactor operating in automatic flow control mode.
Figure 6B:
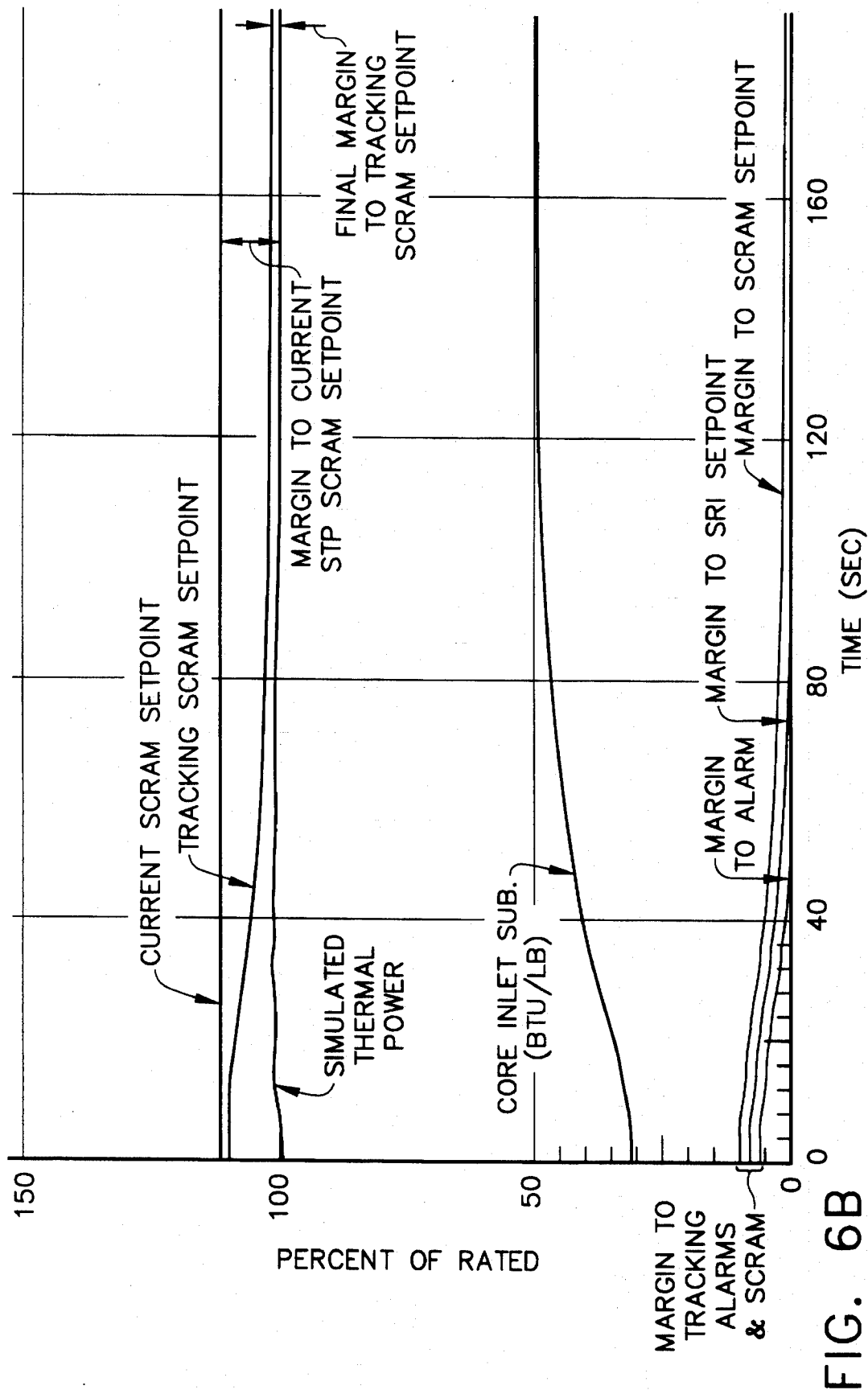
FIG. 6B is a graph showing the setpoints determined in response to the reactor temperature (subcooling) transient shown in FIG. 6A starting from 100% power, 108% flow, in accordance with the flow-referenced logic option of the invention.
Figure 6C:
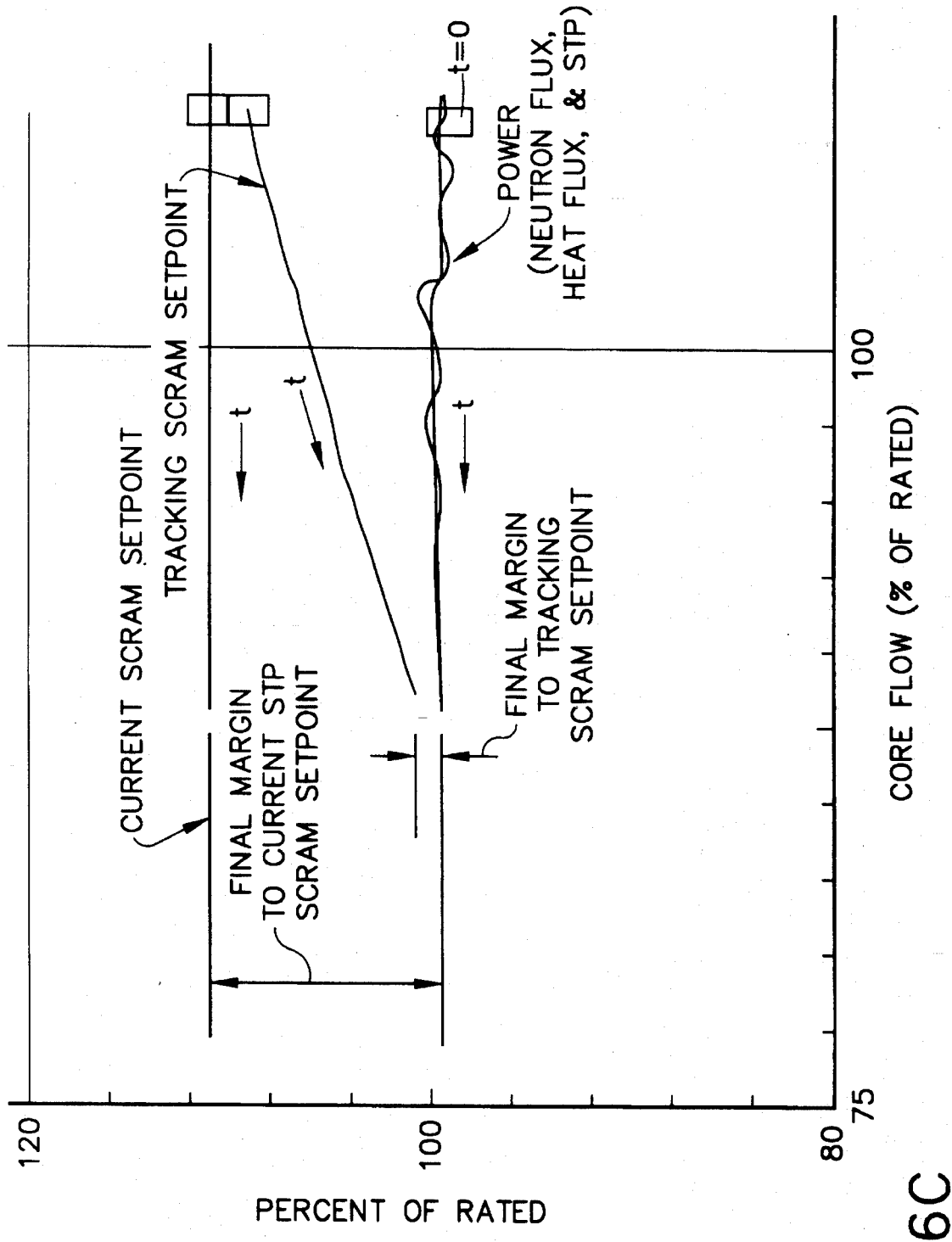
FIG. 6C is a power/flow operating map showing the response to the reactor temperature (subcooling) transient shown in FIG. 6A in accordance with the invention.

In this example, an unplanned temperature transient similar to the one described in Example 1 is postulated to occur, but the reactor is assumed to be operating at full power in automatic flow control mode. The purpose of the automatic flow control is to hold reactor power at the initial power level setpoint. In this control mode, the reactor recirculation flow is automatically reduced during this event to counteract the power increasing effects of the transient. FIGS. 6A, 6B and 6C show a typical response to this type of event. These figures show that as the simulated temperature change tries to increase the reactor power, the automatic controls decrease the core recirculation flow so that power remains essentially constant. FIGS. 6A and 6B show the response of key reactor parameters versus time.

As in Example 1, the currently limiting magnitude of the temperature change has been simulated. The transient settles to a final operating condition without the need for any protection. Since the controlled power level is supported, however, by less core coolant flow, it is approaching a condition in which insufficient cooling may be available to the reactor fuel. FIG. 6C shows how the reactor operating point moves along at constant power, but decreasing core flow characteristic during the simulated event.

The invention with the flow-referenced option reduces the tracking setpoints as recirculation flow is reduced, so that by the end of this case, the scram setpoint is just above the final operating point. Tracking alarm actions are ignored in this case. Any larger temperature transient would initiate the new protection. The existing flow-referenced scram setpoint is also shown. It follows the characteristic shown in FIG. 2, and is further away from the operating condition. If the event had been simulated at lower initial power (e.g., 70% as in Example 1), the difference between the operating point and the conventional scram setpoint would be larger, while the setpoint provided by the invention will remain close to the operating point.

EXAMPLE 3

Core Flow and Power Increase

Figure 7A:
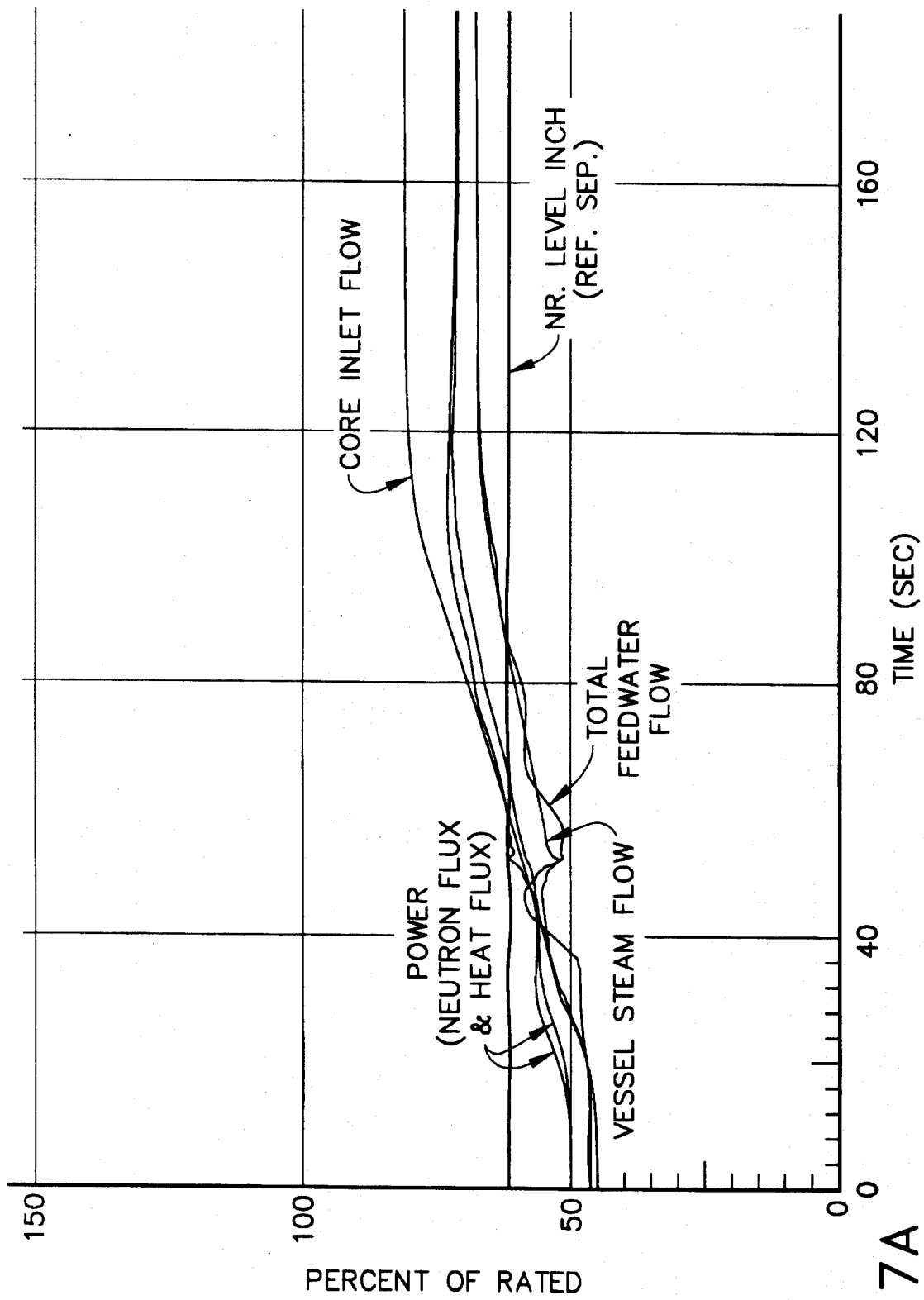
FIG. 7A is a graph showing the response over time of key reactor parameters to a planned reactor core flow and power transient.
Figure 7B:
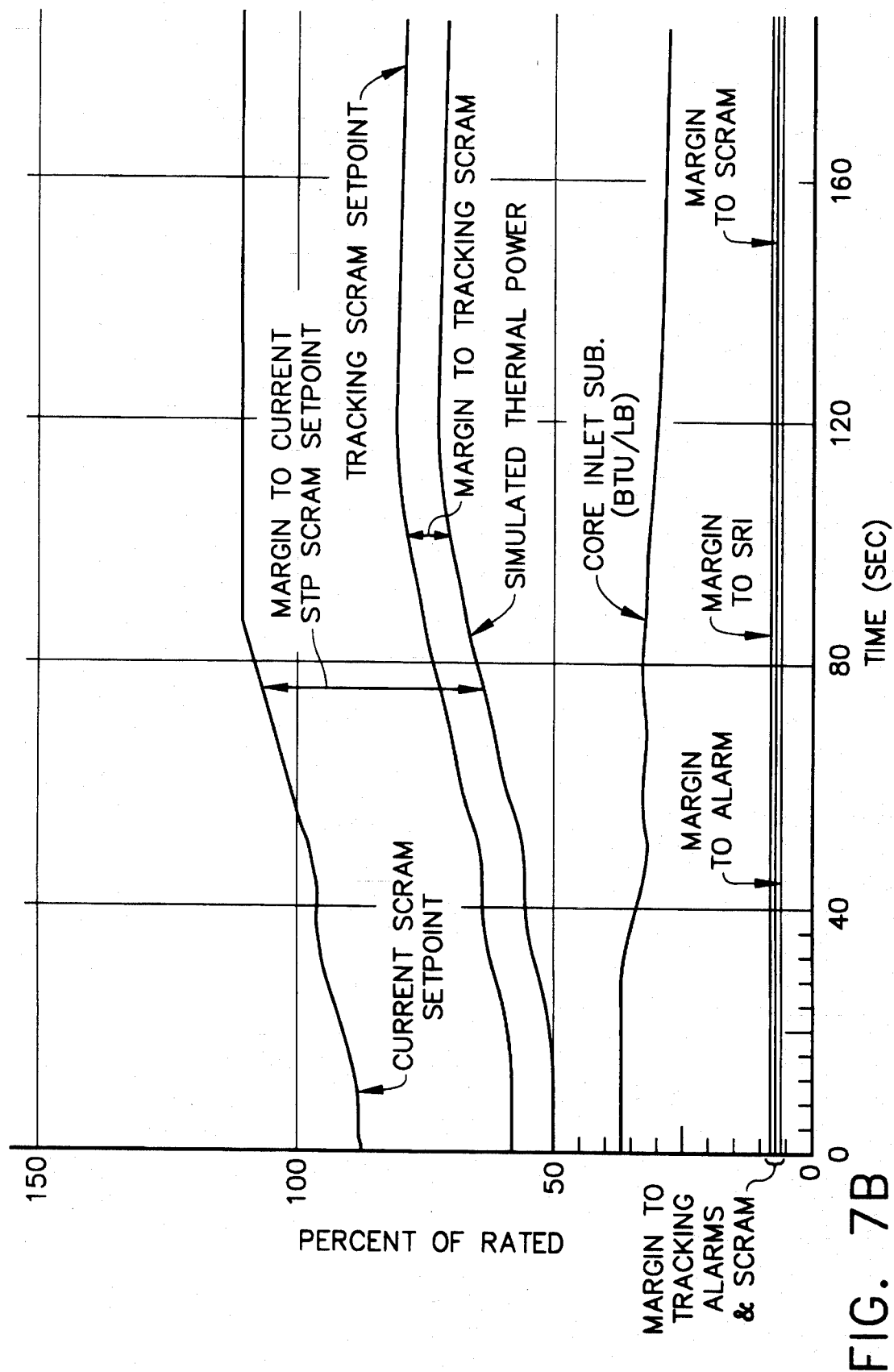
FIG. 7B is a graph showing the setpoints determined in response to the reactor core flow and power transient shown in FIG. 7A for 50% power, 45% flow, in accordance with the basic or flow-referenced logic option of the invention.
Figure 7C:
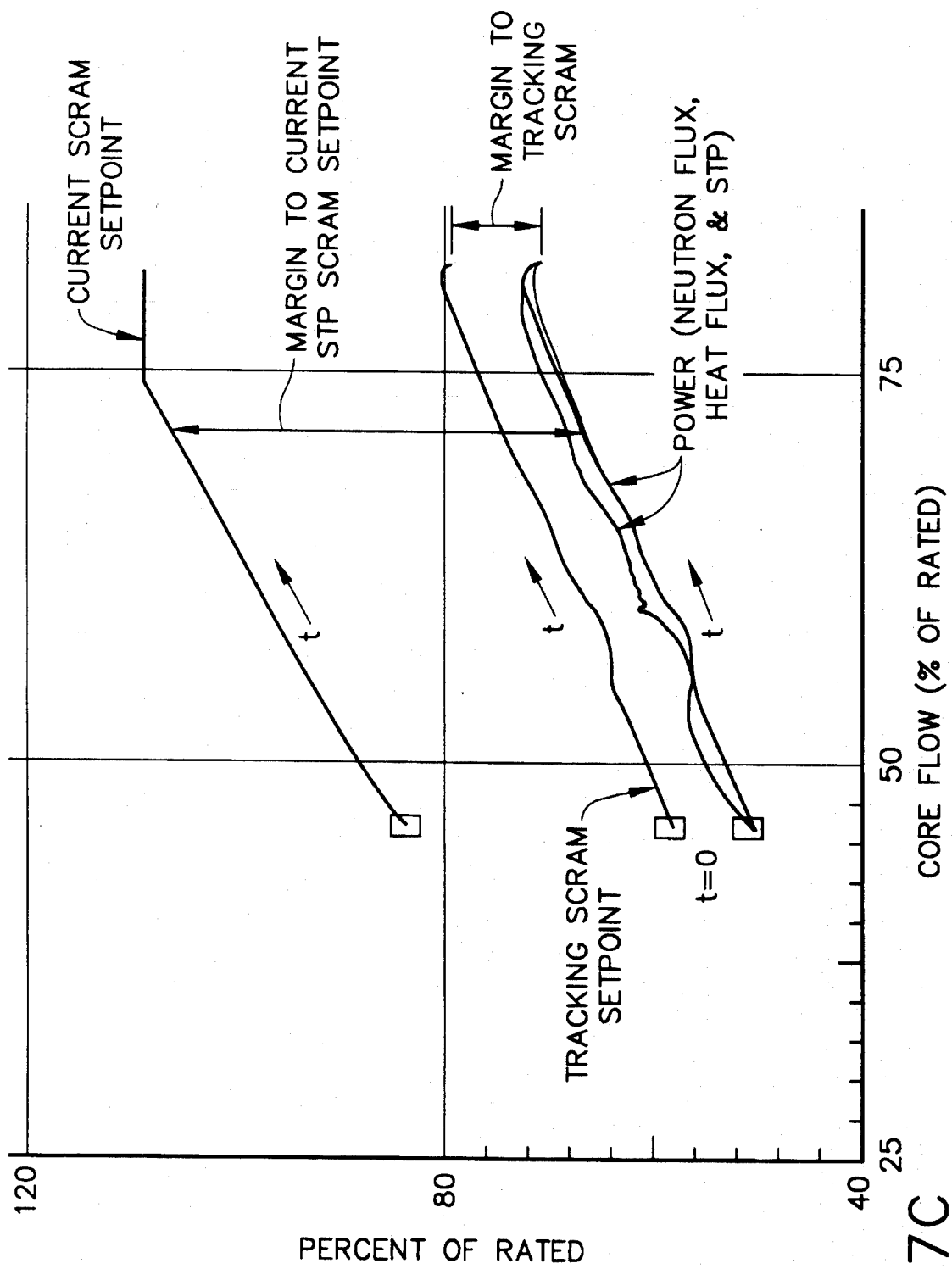
FIG. 7C is a power/flow operating map showing the response to the reactor core flow and power transient shown in FIG. 7A in accordance with the invention.

One common reactor maneuver that must be accommodated without reactor trip is the normal increase of power using the reactor core flow control system. FIGS. 7A, 7B and 7C demonstrate how the invention is able to accommodate this type of maneuver.

In this situation, the operators will have planned and prepared for the power increase, and the permissive logic of the invention is activated at the start of the increase. The responses of the reactor and the tracking logic of the invention are shown in FIGS. 7A and 7B. Core flow and power are increased gradually in this ramp-like maneuver. The tracking setpoints of the invention increase with the reactor power.

Margin is maintained, as required, between the STP signal and the alarm and scram setpoints. FIGS. 7A and 7B shows responses of key reactor parameters versus time. FIG. 7C shows the tracking action of the setpoint logic in accordance with the invention. The trip avoidance margins for the alarms (two in this example) and the scram are shown at the bottom of FIG. 7B to stay almost equal to the initial margin throughout the maneuver.

The preferred embodiments have been disclosed for the purpose of illustration only. Variations and modifications of those embodiments will be readily apparent to engineers of ordinary skill in the art of boiling water reactor protection systems. All such variations and modifications are intended to be encompassed by the claims appended hereto.

We claim:

1. A method of protecting against transient overpower in a boiling water nuclear reactor, comprising the steps of:

operating a boiling water nuclear reactor in a permissible operating range which is above a cavitation region, below a maximum operating line and bounded by a minimum normal flow line and a maximum normal flow line;

monitoring the operating power level of said reactor during said operating step;

automatically adjusting a first (primary) setpoint to maintain said first setpoint at a first selected margin above said monitored operating power level during a planned change in said operating power level and not automatically adjusting said first setpoint during an unexpected change in said operating power level;

limiting the upper and lower values of the variation of said first setpoint; and activating systems which automatically scram (shutdown)the reactor when the level of said monitored operating power level rises unexpectedly above said first setpoint.

2. The method as defined in claim 1, wherein said first setpoint automatically activates alternate reactor protection system action.

3. The method as defined in claim 1, wherein said step of monitoring the operating power level of said reactor is performed by forming a filtered signal representing the operating power level of said reactor.

4. The method as defined in claim 1, further comprising the steps of:

automatically adjusting a second setpoint to maintain said second setpoint at a second selected margin above the level of said monitored operating power level during said planned change in said operating power level and not automatically adjusting said second setpoint during an unexpected change in said operating power level;

limiting the upper and lower values of the variation of said second setpoint; and activating an alarm which alerts an operator and automatically initiates selected action to counteract an unplanned disturbance and to avoid full trip of said reactor when said monitored operating power level rises unexpectedly above said second setpoint.

5. A protection system for protecting against transient overpower in a nuclear reactor, comprising:

means for monitoring the operating power level of said reactor;

means for automatically adjusting a first (primary) setpoint while the operating power level is in a permissible operating range to maintain said first setpoint at a first selected margin above said monitored operating power level during a planned change in said operating power level and not automatically adjusting said first setpoint during an unexpected change in said operating power level; and means for activating systems which automatically scram (shutdown) the reactor when the level of said monitored operating power level rises unexpectedly above said first setpoint.

6. The protection system as defined in claim 5, wherein said first setpoint automatically activates alternate reactor protection system action.

7. The protection system as defined in claim 5, wherein said monitoring means comprises means for forming a filtered signal representing the operating power level of said reactor.

8. The protection system as defined in claim 5, further comprising:

means for automatically adjusting a second setpoint to maintain said second setpoint at a second selected margin above the level of said monitored operating power level during said planned change in said operating power level and not automatically adjusting said second setpoint during an unexpected change in said operating power level;

means for activating an alarm which alerts an operator and automatically initiates selected action to counteract an unplanned disturbance and to avoid full trip of said reactor when said monitored operating power level rises unexpectedly above said second setpoint.

9. In a system for protecting against transient overpower in a nuclear reactor including a first trip unit that when tripped automatically initiates an action to mitigate a transient event, means for monitoring the operating power level of said reactor and means for activating said first trip unit when the level of said monitored operating power level rises unexpectedly above a first (primary) setpoint, the improvement comprising:

means for automatically adjusting said first setpoint while the operating power level is in a permissible operating range to maintain said first setpoint at a first selected margin above said monitored operating power level during a planned change in said operating power level and not automatically adjusting said first setpoint during an unexpected change in said operating power level.

10. The system as defined in claim 9, wherein said monitoring means comprises means for forming a filtered signal representing the operating power level of said reactor.

11. The system as defined in claim 9, wherein said first trip unit is a scram trip unit and said first setpoint is a scram setpoint that when tripped automatically shuts down the reactor.

12. The system as defined in claim 11, further comprising:

an alarm trip unit which initiates automatic action to counteract an unplanned disturbance and to avoid full trip of said reactor;

means for automatically adjusting a second setpoint to maintain said second setpoint a second selected margin above said monitored operating power level during said planned change in said operating power level and not automatically adjusting said second setpoint during an unexpected change in said operating power level; and means for activating said alarm trip unit when the level of said monitored operating power level rises unexpectedly above said second setpoint.

13. The method as defined in claim 4, further comprising the steps of:

monitoring the level of reactor recirculation flow; and utilizing said monitored reactor recirculation flow level to further adjust one of said first and second setpoints.

14. The method as defined in claim 4, further comprising the steps of:

monitoring a reactor parameter; and utilizing said reactor parameter to further adjust one of said first and second setpoints, wherein said reactor parameter is selected from the group consisting of reactor vessel pressure, reactor core temperature, reactor feedwater temperature, reactor feedwater flowrate and reactor steam flowrate.

15. The protection system as defined in claim 8, further comprising:

means for monitoring the level of reactor recirculation flow; and means for utilizing said monitored reactor recirculation flow level to further adjust one of said first and second setpoints.

16. The protection system as defined in claim 8, further comprising:

means for monitoring a reactor parameter; and means for utilizing said reactor parameter to further adjust one of said first and second setpoints, wherein said reactor parameter is selected from the group consisting of reactor vessel pressure, reactor core temperature, reactor feedwater temperature, reactor feedwater flowrate and reactor steam flowrate.

17. The system as defined in claim 12, further comprising:

means for monitoring the level of reactor recirculation flow; and means for utilizing said monitored reactor recirculation flow level to further adjust one of said first and second setpoints.

18. The system as defined in claim 12, further comprising:

means for monitoring a reactor parameter; and means for utilizing said reactor parameter to further adjust one of said first and second setpoints, wherein said reactor parameter is selected from the group consisting of reactor vessel pressure, reactor core temperature, reactor feedwater temperature, reactor feedwater flowrate and reactor steam flowrate.

* * * * *